United States Patent
Edgar et al.

(10) Patent No.: US 11,313,987 B2
(45) Date of Patent: Apr. 26, 2022

(54) METHOD FOR OBTAINING ESTIMATES OF A MODEL PARAMETER SO AS TO CHARACTERISE THE EVOLUTION OF A SUBSURFACE VOLUME OVER A TIME PERIOD USING TIME-LAPSE SEISMIC

(71) Applicant: Total S.A., Courbevoie (FR)

(72) Inventors: Jonathan Anthony Edgar, Pau (FR); Thomas David Blanchard, Pau (FR); Constantin Vili Gerea, Pau (FR)

(73) Assignee: Total S.A., Courbevoie (FR)

( * ) Notice: Subject to any disclaimer, the term of this patent is extended or adjusted under 35 U.S.C. 154(b) by 68 days.

(21) Appl. No.: 16/639,267

(22) PCT Filed: Aug. 17, 2017

(86) PCT No.: PCT/GB2017/052441
§ 371 (c)(1),
(2) Date: Feb. 14, 2020

(87) PCT Pub. No.: WO2019/034827
PCT Pub. Date: Feb. 21, 2019

(65) Prior Publication Data
US 2020/0241158 A1   Jul. 30, 2020

(51) Int. Cl.
*G01V 1/30* (2006.01)
*G01V 1/00* (2006.01)
*G01V 1/18* (2006.01)
*G01V 1/28* (2006.01)

(52) U.S. Cl.
CPC .............. *G01V 1/308* (2013.01); *G01V 1/003* (2013.01); *G01V 1/18* (2013.01); *G01V 1/282* (2013.01)

(58) Field of Classification Search
CPC .......... G01V 1/308; G01V 1/282; G01V 1/18; G01V 1/003; G01V 2210/624; G01V 2210/622; G01V 2210/612; G01V 2210/51
See application file for complete search history.

(56) References Cited

U.S. PATENT DOCUMENTS

| | | |
|---|---|---|
| 2011/0232902 A1 | 9/2011 | Chu |
| 2013/0242699 A1 | 9/2013 | Lambare |
| 2014/0019056 A1 | 1/2014 | Thore |

(Continued)

OTHER PUBLICATIONS

Lambare et al., Computation of Kinematic Attributes for Pre-Stack Time Migration, 2008 SEG Las Vegas Annual Meeting, pp. 2402-2406 (Year: 2008).*

(Continued)

*Primary Examiner* — Toan M Le
(74) *Attorney, Agent, or Firm* — Foley & Lardner LLP

(57) ABSTRACT

Disclosed is a method and associated computer program and apparatus for characterising changes within a subsurface volume between a first time and a second time. The method comprises obtaining first seismic data corresponding to the first time and processing this data to obtain a seismic image of the subsurface volume. This processing is reversed for relevant portions of the seismic image to obtain relevant portions of first seismic data. Changes within the subsurface volume between the first time and the second time are characterised by estimating the changes between second seismic data corresponding to the second time and the relevant portions of first seismic data.

11 Claims, 5 Drawing Sheets

(56) References Cited

U.S. PATENT DOCUMENTS

2014/0200814 A1     7/2014   Guillaume
2016/0356905 A1    12/2016   Alkhatib

OTHER PUBLICATIONS

One Petro Search Results, May 21, 2021, 10 pp. (Year: 2021).*
International Search Report and Written Opinion of the International Searching Authority on PCT/GB2017/052441, dated May 17, 2018 (12 pages).
Einar Iversen et al, "Kinematic time migration and demigration of reflections in pre-stack seismic data", *Geophysical Journal International.*, vol. 189, No. 3, Apr. 10, 2012 (Apr. 10, 2012), pp. 1635-1666.

\* cited by examiner (a)

(b)

METHOD FOR OBTAINING ESTIMATES OF A MODEL PARAMETER SO AS TO CHARACTERISE THE EVOLUTION OF A SUBSURFACE VOLUME OVER A TIME PERIOD USING TIME-LAPSE SEISMIC

CROSS-REFERENCE TO RELATED APPLICATION

The present application is a U.S. National Stage Application under 35 U.S.C. § 371 of International Patent Application No. PCT/GB2017/052441, filed on Aug. 17, 2017, the disclosure of which is incorporated by reference herein in its entirety.

TECHNICAL FIELD

The present invention relates generally to the field of geosciences and more particularly to seismic data processing. Specifically the invention relates to a method for obtaining estimates of changes in a model parameter (such as propagation velocity or travel time of the seismic signal) so as to characterise the evolution of a subsurface volume over a time period.

BACKGROUND

In the oil and gas industry, seismic surveys are carried out in order to provide subsurface images so that accumulations of hydrocarbons or other fluids might be identified. In a seismic survey, one or several sources emit elastic waves in the form of pressure or ground motion modulation from specific locations (wavefield), at or below the land or sea surface or in a borehole. This wavefield propagates away from the source(s) through the subsurface. Along with this propagation, a fraction of the incident wavefield is reflected from the heterogeneities in the elastic material properties of the subsurface (such as acoustic impedance). This excitation by the incident wavefield generates a reflected wavefield from the heterogeneities, which manifests as pressure, particle motion or some derived quantities and can be detected and recorded at the surface or in a borehole at a number of receiver locations.

Processing of the measurements is undertaken so as to construct a 3D image of the subsurface. Repeated surveys at selected time intervals (days, months, years) allow observation of the changes in, over or under a given reservoir across the time interval—e.g. before oil or gas production starts and after some period of production or injection and to compare the results of measurements. This is called 4D seismic and involves comparing 2D or 3D seismic surveys carried out at different time instances. The aim is to observe changes in the state of the formations and fluids consequent upon production of hydrocarbons from or the injection of fluids into a reservoir. Proper detection of the changes and proper identification of the effects, factors and processes requires specialised acquisition techniques and data processing steps.

The seismic data may be first processed to compensate for variations in acquisition (or non-repeatability of seismic surveys) and changes in velocity in the sub-surface.

In EP 1 865 340 to the Applicant, and incorporated herein by reference, the evolution of an oil reservoir in the process of producing is carried out by jointly inverting for the changes in the propagation times and seismic amplitudes of a seismic wavelet along propagation paths in the ground. Inverting allows to back filter, in effect, deriving the original from the solution. A base survey of the reservoir is provided, with a set of seismic traces at a first time T associated to a first velocity field $V_b$; a monitor survey of the reservoir is provided, the monitor survey being taken at a second time T+$\Delta$T, with a set of seismic traces associated to the same positions as in the base survey; the monitor survey is associated to a second velocity field $V_m$. For a set of samples i in the base survey, one computes over the samples of the set the sum Sofa norm of the difference between:

the amplitude $b_i$ of the seismic trace in the base survey at each sample i and the sum of the amplitude $m_{i'}$ of the seismic trace at a time-corresponding i' in the monitor survey and the amplitude due to the reflectivity change local to the time-corresponding sample i' induced by the difference between the first velocity field $V_b$ and the second velocity field $V_m$; the time-corresponding sample i' being shifted in time by a time-shift derived from the velocity changes along the propagation path from the surface to time-corresponding sample i'. This sum is minimised to derive the velocity changes from the base survey to the monitor survey and thus characterise the evolution of the reservoir, the overburden and underburden.

This analysis is based on the fact that changes in the reservoir, due to exploitation, will cause changes to the petrophysical properties of the rock and therefore to the seismic velocity field. Practically, oil will be substituted by gas or water and/or the fluid pressure will change, modifying saturation, porosity, permeability and pressure, and consequently in velocity. Changes within the reservoir may also perturb the stress and strain state of the surrounding rocks, further altering their velocities. These changes to velocity will produce time shifts in the seismic response of underlying reflectors and associated changes in reflectivity, causing an alteration of the local wavefield. By using an inversion technique, for every point in the 3D volume, an estimate of the 4D changes having occurred in the time lapse between collection of the base and monitor surveys is provided. It is therefore possible to deduce a field of 4D velocity changes without having to proceed with cross correlation of the traces.

Although the 4D inversion problem appears relatively easy to formulate as the minimisation of a difference between base and monitor seismic data, it is an ill-posed problem that has multiple solutions: for instance, any smooth zero-mean velocity changes map into zero time-shift and does not generate any 4D amplitude difference. Moreover the inversion becomes even more highly non-linear for fields that induce subsidence and have potentially large time shift.

In EP 1 865 340, the crucial step is in minimising the difference between base and monitor seismic data sets. Essentially this is an optimisation problem which requires minimising of the objective function or cost function over all choices of variables i.e. velocity changes that satisfy the modelled constraints. Usually the cost function is computed over all the available time-samples but it can be also calculated for decimated time samples or the sample number can be increased by interpolation to improve the accuracy of the solution.

In most existing implementations, the base and all subsequent monitor surveys must record energy passing through the same subsurface volume; a criterion which has led to the industry standard practice of repeating survey acquisition geometries as closely as possible. To extract useful production-related time-lapse information the raw data are processed (e.g., migrated) so as to form an image for each vintage which better approximates the simplified models used to understand the time-lapse measurement. Processing of time-lapse seismic data follows a very similar workflow (with a few limited innovations) to processing conventional seismic data. Typical time-lapse projects take between 6 months and 2 years to deliver production-related time-lapse information used to make reservoir management decisions.

It is desirable to reduce the processing burden and therefore the abovementioned timescales for delivering useful time-lapse information. It would further be desirable to be able to relax the requirement to match survey acquisition geometries between acquisition vintages.

SUMMARY OF INVENTION

Disclosed is a method and associated computer program and apparatus for characterising changes within a subsurface volume between a first time and a second time. The method comprises obtaining first seismic data corresponding to the first time and processing this data to obtain a seismic image of the subsurface volume. This processing is reversed for relevant portions of the seismic image to obtain relevant portions of first seismic data. Changes within the subsurface volume between the first time and the second time are characterised by estimating the changes between second seismic data corresponding to the second time and the relevant portions of first seismic data.

In a first aspect of the invention there is provided a method for characterising changes within a subsurface volume between a first time and a second time, said method comprising:

obtaining first seismic data acquired by the transmission of seismic signals into the subsurface volume and subsequent detection of some or all of the seismic signals after reflection within the subsurface, said first seismic data corresponding to the first time;

processing said first seismic data to obtain a seismic image of the subsurface volume; reversing said processing for relevant portions of said seismic image to obtain relevant portions of first seismic data;

obtaining second seismic data acquired by the transmission of seismic signals into the subsurface volume and subsequent detection of some or all of the seismic signals after reflection within the subsurface volume, said second seismic data corresponding to the second time; and characterising said changes within the subsurface volume between the first time and the second time by estimating the changes between said second seismic data and said relevant portions of first seismic data.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1:
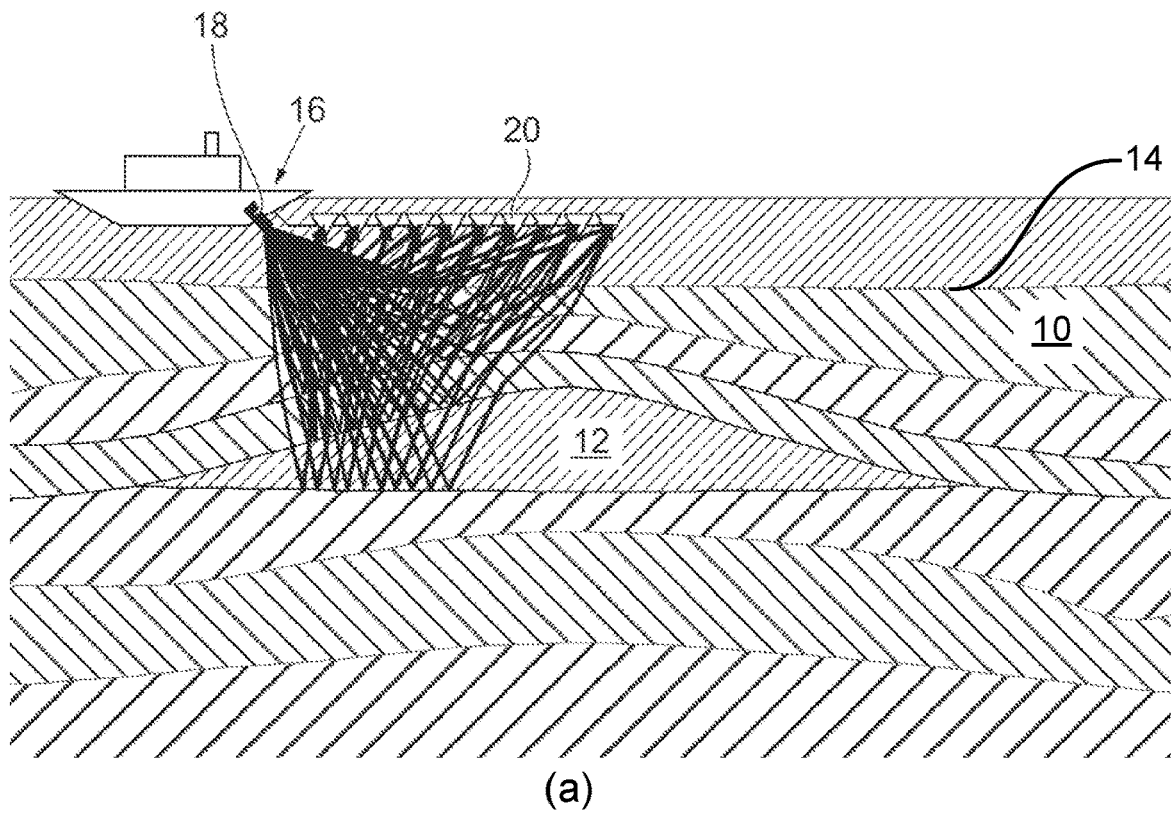
FIG. 1 shows schematic illustrations of (a) a base survey and (b) a monitor survey being performed.
Figure 1:
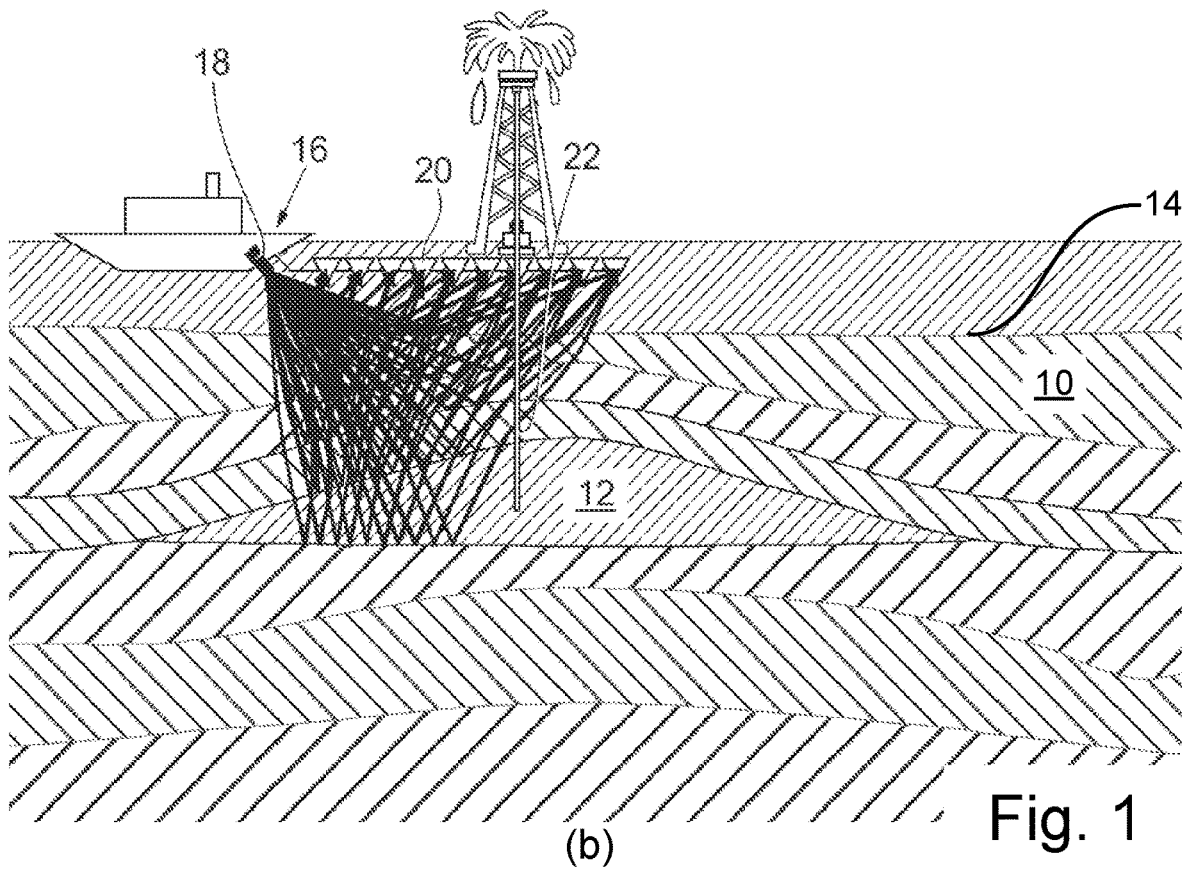

Referring initially to FIGS. 1(a) and 1(b) there is illustrated a subsurface volume 10 comprising a reservoir containing hydrocarbons 12. A survey vessel 16 may comprise a transmitter 18, such as an acoustic transmitter, and an array of receivers 20. The survey vessel may perform a survey by travelling over the subsurface volume 10, transmitting seismic signals into the subsurface volume and subsequently receiving some or all of said seismic signals (the received seismic signals) after reflection of said seismic signal off reflectors 14 within the subsurface volume. A reflector 14 may comprise an interface between layers of contrasting acoustic, optical or electromagnetic properties. The first survey or initial survey, FIG. 1(a), may be referred to as a base survey and is typically performed in the exploration phase before production begins.

The base survey of the subsurface volume 10 provides first seismic data at a first time T, comprising a set of seismic traces. For a given trace, the base survey provides amplitudes that are a function of time. With digital recording and processing the trace is sampled at a set of values; typical trace lengths correspond to around 1000 samples. The trace is then handled as a set of values.

One or more wells 22 may be drilled in order to extract the hydrocarbons 12. As the subsurface volume 10 is produced, hydrocarbons will be substituted by other fluids and the fluid pressure will change. Additionally, enhanced oil recovery techniques may be applied wherein a fluid is injected into the reservoir at one or more locations giving changes in fluid pressure and saturation. Changes within the reservoir may also change the stress and strain state of the surrounding rocks within the subsurface volume. Thus when a further survey is carried out, FIG. 1(b), these changes will be seen due to a consequential change in the velocity field. These changes to velocity will produce time shifts in the seismic expression of underlying reflectors and associated changes in reflectivity, causing a change in the local wavefield.

Thus reservoir monitoring performs a second survey, which may be referred to as a monitor survey, of the subsurface volume 10. The monitor survey of the subsurface volume 10 provides second seismic data at a second time $T+\Delta T$, comprising a set of seismic traces. In the simplest assumption, $\Delta T$ is a positive quantity, and the monitor survey is taken at a time later than the base survey; however, the order in which the surveys are taken is irrelevant to the operation of the process of the invention and, in principle, the time lapse $\Delta T$ could as well be negative, which amounts to comparing the earlier survey to the later one. As for the base survey, a sampled trace in the monitor survey is represented as a set of values.

Ideally, the traces in the monitor survey are associated to the same positions as in the base survey. This is carried out by using, inasmuch as possible, the same equipment, acquisition geometry and processes for running the base and monitor surveys. Techniques such as interpolation may be used where traces in the monitor survey and in the base survey do not fulfil this condition.

Seismic data is acquired over a wide range of transmitter-receiver offsets. The offset is the horizontal distance between transmitter and receiver (e.g. the distance along the surface). In conventional practice, data over the full range of offsets are split into "data gathers", or ranges. The number of gathers depends on many factors, for example: the acquisition parameters (in particular of the maximum offset that is acquired), the depth, and the seismic data quality. This data is often referred to as pre-stack data as it has not been processed using a technique known as stacking. Stacking is the summing of the seismic traces of this pre-stack data to improve the signal-to-noise ratio. Traces from different shotpoints with a common midpoint are migrated and stacked to form a single trace (post-stack data) during seismic processing. This stacking process gives the data the appearance of zero-offset data.

Estimating time shifts, and time strains, from time-lapse seismic data is usually done post-stack. This helps attenuate noise which may otherwise contaminate the estimate of time-lapse attributes. However, it also discards all offset-dependent information and relies on migration repositioning the recorded energy to its equivalent zero-offset location during processing.

Non-linear inversion, often referred to as warping, is a known technique for estimating time shifts, time-strain and/or velocity changes from post-stack time-lapse base and monitor survey data. An iterative solver is used to find a minimum (with respect to time shifts) of an objective function of the form:

$$E = \sum_{j=1}^{N} (b(t_j) - m(t_j + \Delta t_j))^2.$$

The vector $b(t_j)$ contains base samples recorded at the discrete times of vector $t_j$. The vector $m(t_j+\Delta t_j)$ contains monitor samples recorded at the discrete times of vector $t_j$ plus the vector of time shifts, $\Delta t_j$. The time sample index is j. To solve for $\Delta t_j$ involves linearizing the objective function around a $\Delta t_j$ estimate and solving for an incremental $\Delta t_j$ update. Linearization requires calculating the objective function derivative at each iteration. This and most other methods used to estimate time-lapse attributes use the zero-offset ray path and zero-dip assumptions: that seismic waves have travelled on a vertical path through the subsurface, reflecting from horizontal reflectors. They require post-stack time-lapse seismic data which must have been migrated to form time-lapse images.

Figure 2:
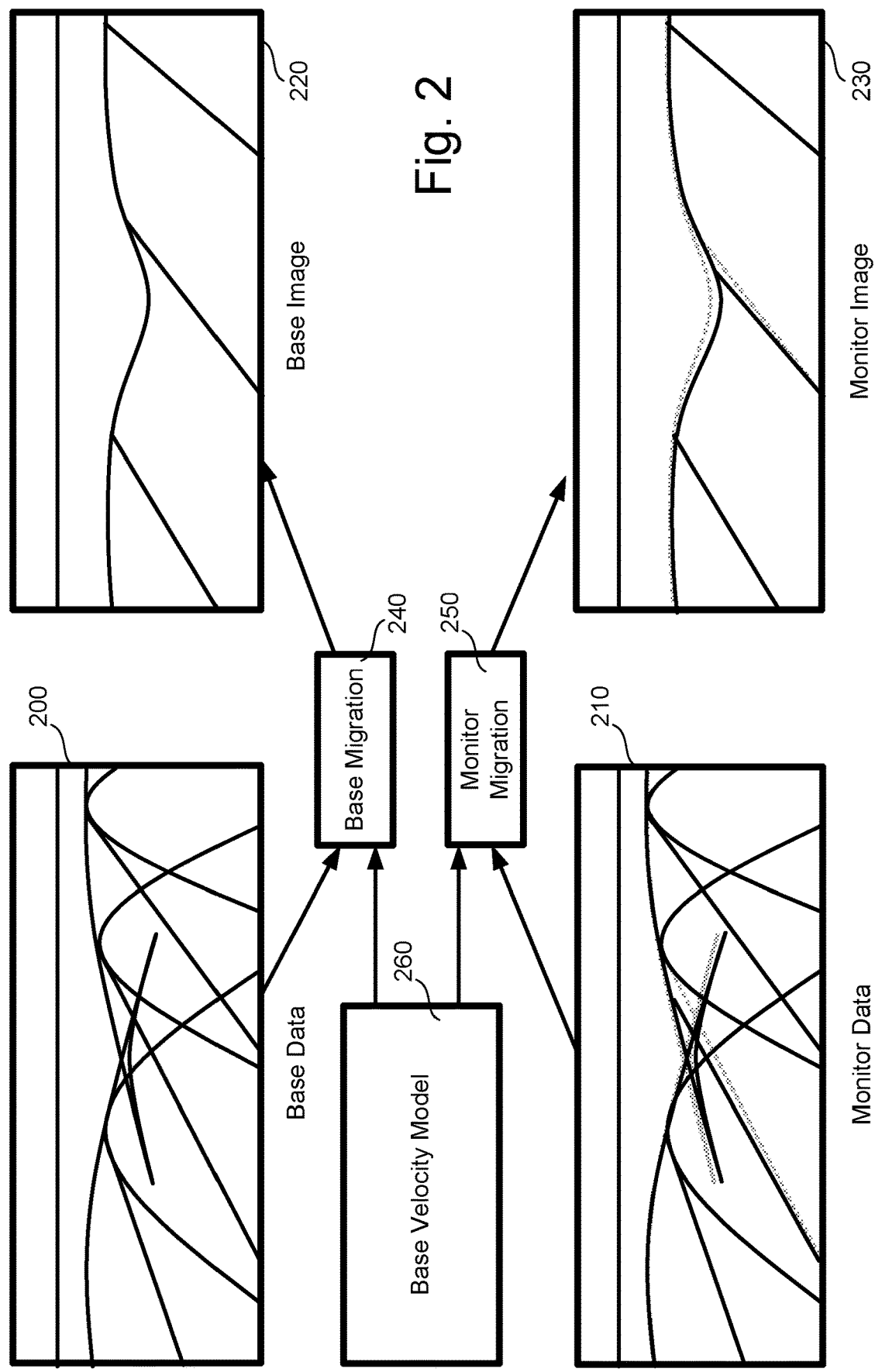
FIG. 2 illustrates the steps of base and monitor data processing according to a typical time lapse seismic process.

The processing steps described above, such as migration, are highly computationally expensive and therefore take a long time. This means that the duration of time-lapse projects typically can be measured in terms of one or more years. However, unprocessed or unmigrated data (e.g., raw data in the time domain) is essentially unintelligible. This is illustrated in FIG. 2, which shows unprocessed base data 200 and unprocessed monitor data 210 in the data domain and the equivalent base image 220 and monitor image 230 in the image domain after processing/migration 240, 250 e.g., by using a velocity model 260. The velocity model maps points in the data domain to corresponding spatial locations to form an image of the surveyed region. As such, because of spatial variations in the velocity model (different subsurface properties), points which are quite distant in the data domain may be close/adjacent in the image domain, and therefore correspond to the same subsurface reflector or feature. By migrating the data, the processed image becomes interpretable, insofar as subsurface features (e.g., reflectors or horizons) can be identified.

FIG. 2 shows a typical current time lapse process. At a first time, a base survey is carried out, yielding base data 200. This base data is migrated 240 according to a base velocity model 260 to form a base image 220. At a later time, a monitor survey is carried out, yielding monitor data 210. This monitor data is migrated 250 according to the base velocity model 260 (which may or may not have been updated during the base migration 240) to form a monitor image 230. In the diagram, for illustration, the monitor data 210 and monitor image 230 also show (in grey, dotted lines) respectively the base data and base image at points where there has been a change in the monitor data/image relative to the base data/image. The monitor image 230 can then be interpreted with respect to the base image 220, e.g., by using a warping method as mentioned above, to identify changes in the intervening time between surveys.

It is proposed herein to use existing knowledge gained from processing the first time-lapse vintage (base) to short-cut the conventional laborious processing of subsequent vintages acquired at later times (monitors). Such a proposal may comprise identifying the signals in the raw base data which contribute to forming the processed base image, via a de-processing step which reverses the processing for only relevant portions of the base image. This step may comprise performing a kinematic de-migration of locally coherent events (LCEs) within the base image. These LCEs comprise any portion of energy within the base migrated image that has spatial coherency in any dimension (e.g., along a horizon or a NMO pick). LCEs are a known concept and will not be described further herein. Kinematic de-migration uses the migration velocity model to locate the energy in the raw data that has mapped to the LCE positions. After de-migration the LCEs (in the data domain) are known as kinematic invariants (KIs) because their de-migrated positions are independent of the velocity model used for migration and de-migration. The inventors have identified that the base KIs can be used to locate the monitor KIs, without the need for processing the monitor data. For example, existing image registration methods may be used to map between sub-volumes of base data centred on KIs and the monitor data local to the same KIs. The translation (magnitudes and directions of shifts) of KIs from base to monitor(s) provides useful production-related time-lapse information directly in the pre-stack unmigrated data domain. This information can be used in various ways, for example: migrated to give qualitative time-lapse attribute maps, inverted to estimate causal properties such as velocity change, etc. It is conceivable that all this can be done during the monitor acquisition while the data is being recorded. This could mean that useful time-lapse information may be delivered almost in real-time.

Figure 3:
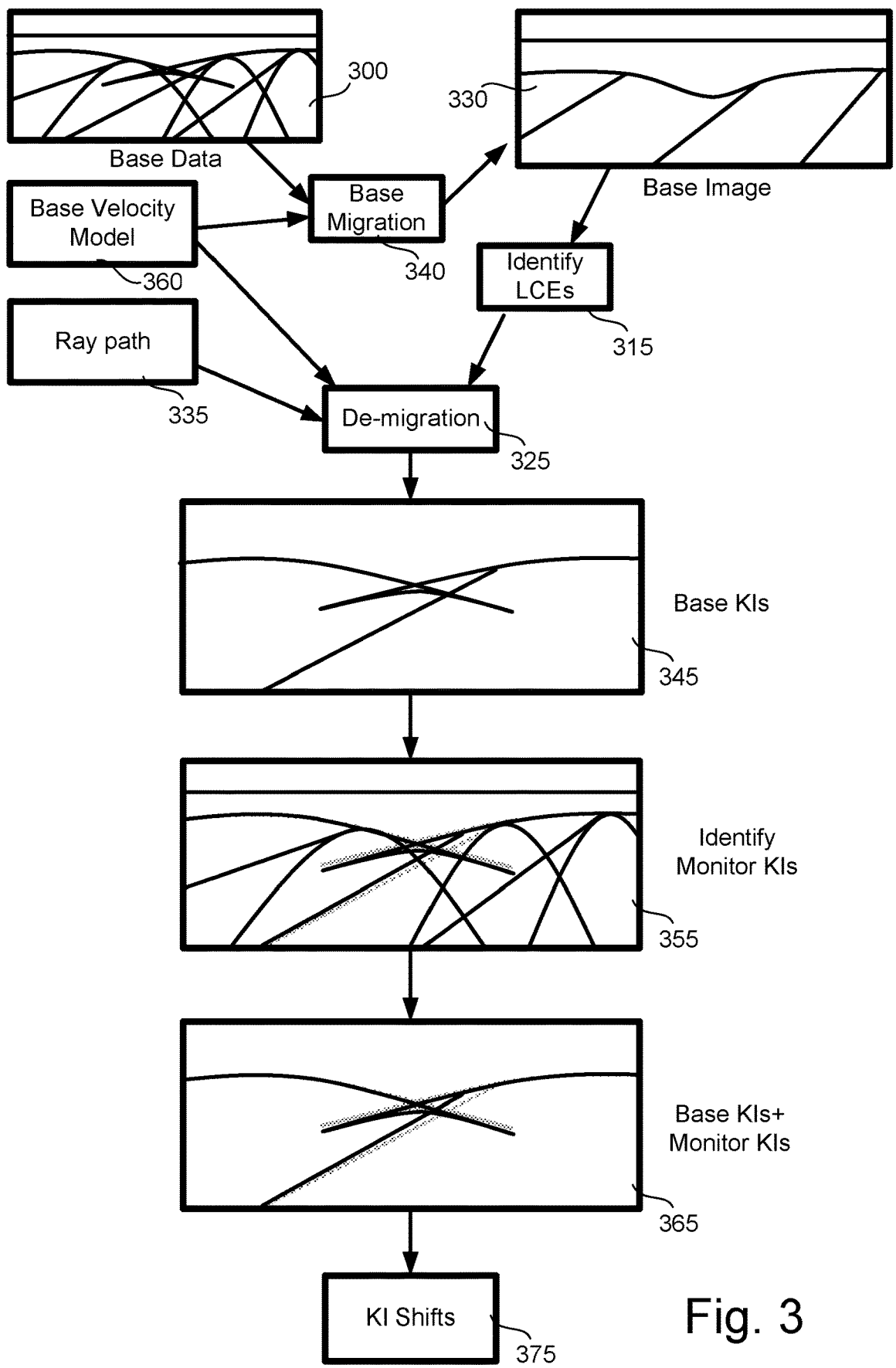
FIG. 3 illustrates the steps of a time lapse seismic process according to an embodiment of the invention.

FIG. 3 illustrates the proposed methodology. The base data 300 is migrated 340 using the base velocity model 360 into a base image 330 in the conventional manner. Following this, LCEs are interpreted 315 (manually or automatically) from within the base image 330. This may comprise identifying energy within the base migrated image that has spatial coherency in any dimension. Many methods for identifying LCEs in migrated (e.g. pre-stack) data have been described and will be known by the skilled person, e.g. picking of dip and/or NMO (normal move out) and/or RMO (residual move out). Once identified, the LCEs are de-migrated 325, using the base velocity model 360 and one or more traced ray paths 335, to map the LCEs from the image domain to the data domain. This identifies where in the data domain the useful energy corresponding to the LCEs is located. Once in the data domain, the LCEs become the base KIs 345, which comprise useful base data. The base KIs 345 may be used to locate 355 the useful energy in the monitor data (i.e., the monitor KIs). It is assumed that the 4D changes will be small and that the base KIs and monitor KIs will be close to one another. Changes, hereafter referred to as KI shifts, between the base KIs and monitor KIs 365 can then be identified.

In a specific embodiment, the monitor KIs are not necessarily explicitly identified as implied by step 355, but rather this is effectively achieved by using an algorithm to find changes (KI shifts 375) between the base KIs and the monitor data in regions close to the base KIs only. Such an algorithm may comprise a windowed warping algorithm similar in principle to the warping algorithm presently used on migrated data, but limited to data windows centred on the base KIs. In other words, the warping is performed between the base KIs and only the monitor data corresponding to regions of data close (e.g., in terms of travel time) to the base KIs.

The KI shifts can then be transformed into a useful attribute, using for example attribute migration or 4D time-lapse tomography. 4D time-lapse tomography is described in PCT application WO2016/110660, which is herein incorporated by reference in its entirety.

The concepts described herein rely on the assumption that the changes in the reservoir are small and therefore the corresponding changes between base KIs and monitor KIs are also small, which is valid in most cases. As such the proposed method may not be suitable in all cases (e.g., it may not be effective where reservoir changes are too large between vintages), but should be useful in the majority of cases.

Figure 4:
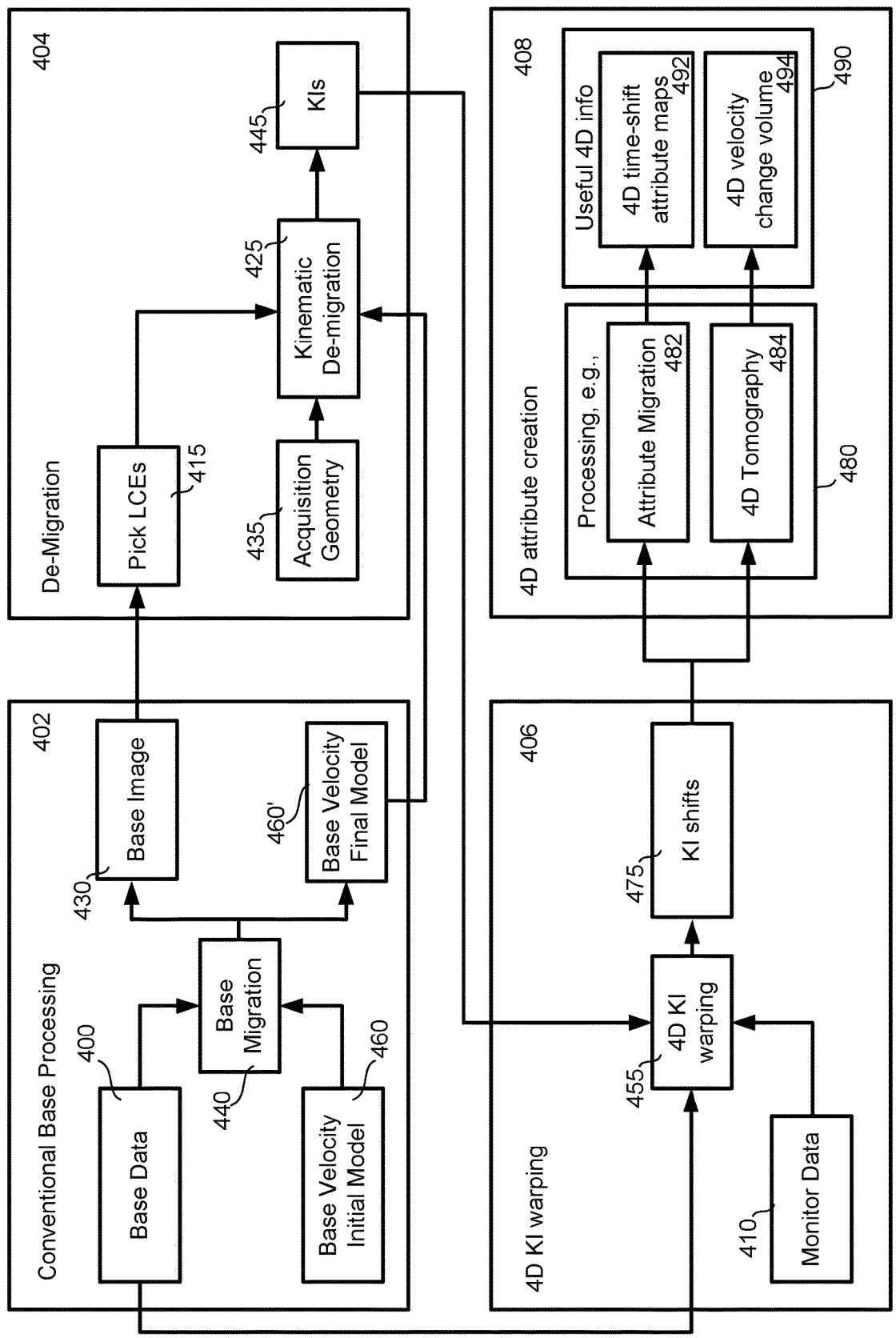
FIG. 4 illustrates in more detail the steps of the time lapse seismic process illustrated by FIG. 3.

FIG. 4 illustrates the proposed methodology according to an embodiment, in more detail. The proposed methodology comprises four main stages, a (conventional) base processing stage 402, a localised processing reversal stage 404, a KI warping stage 406 and a transformation stage 408 to determine a useful 4D attribute from the KI shifts.

In the base processing stage 402, the base data 400 is processed, for example migrated, 440 using the base velocity model 460 into a base image 430. Optionally, an updated (final) base velocity model 460' is also determined. In the localised processing reversal stage 404, the LCEs are picked 415 and the processing performed at base processing stage 402 is reversed or undone. This may comprise de-migrating 425 the LCEs using the updated base velocity model 460' (or original base velocity model 460) and acquisition geometry 435 to obtain the KIs 445. In the KI warping stage 406, the KIs 445 are "KI warped" 455 onto the unprocessed and unmigrated monitor data 410. This may comprise inverting for changes between the base KIs and monitor data local to those base KIs, e.g., by inverting within a data window around each KI. Acquisition geometry 435 may relate to the base survey, or relevant monitor survey, as will be explained. The result of this KI warping 455 are KI shifts 475 (time shifts). In the transformation stage 408, the KI shifts are transformed 480 to one or more useful attributes 490, e.g., using an attribute migration (on only the shift), to obtain a 4D time-shift attribute map 492 or by using a 4D tomography technique, to obtain a 4D velocity change volume 494.

Figure 5:
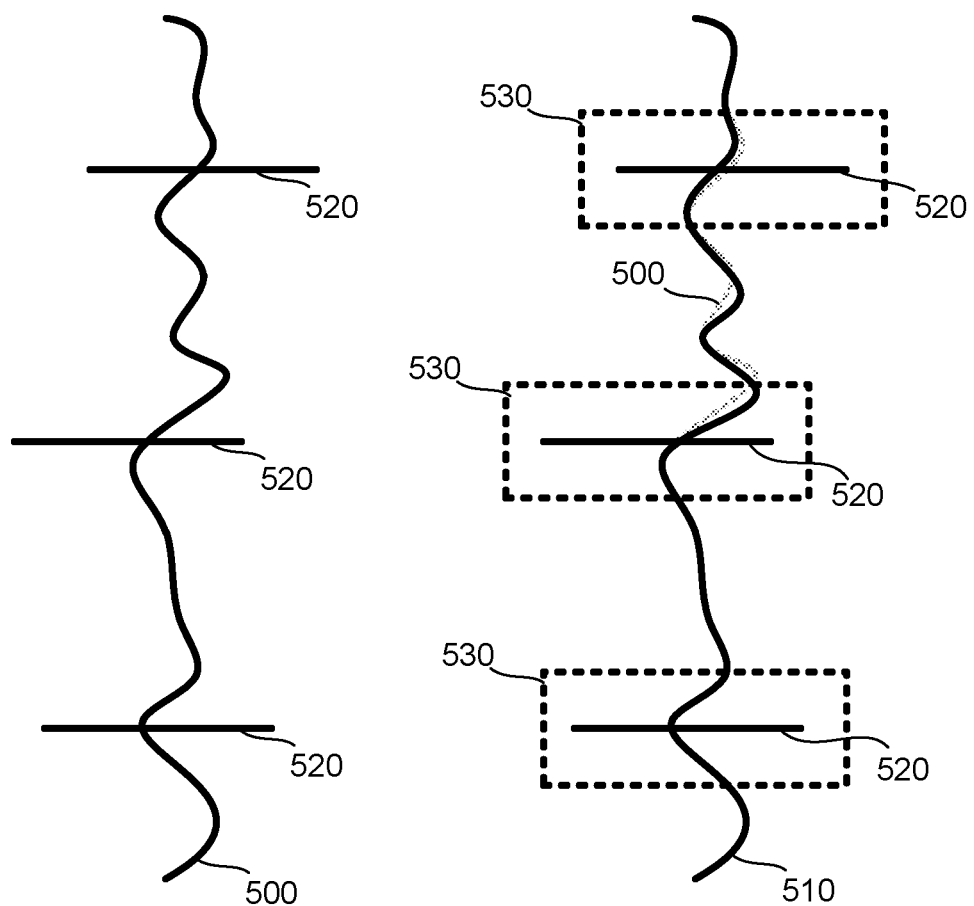
FIG. 5 illustrates the step of warping of monitor data to base data within data windows centred on each kinetic invariant.

FIG. 5 illustrates the step of KI warping according to an embodiment. FIG. 5 shows a de-migrated base seismic trace 500 and monitor seismic trace 510. Migration of the base seismic data and de-migration of relevant portions of the data image relating to LCEs enables the locations of KIs 520 (indicated by horizontal lines) to be identified. These KIs 520 may correspond to horizontal subsurface reflectors, for example. Monitor seismic trace 510 is shown with the base seismic trace 500, in grey and dotted, overlaid. A schematic window 530 is shown centred on each KI. It is proposed that any inversion technique such as warping (or any other suitable technique) for determining/estimating the differences between the base seismic trace 500 and monitor seismic trace 510 should limit the inversion to only the portions of the traces within the windows 530. Each window 530 may therefore only include a portion of the seismic traces 500, 510 either side of a single KI 520.

An additional advantage of the proposed methods is it enables a relaxation of the requirement that the acquisition geometries between vintages should be maintained as closely as possible. Once the base processing is complete, and before any monitor data is acquired, there already exists an estimate of the subsurface velocity structure. Using this knowledge it is possible to de-migrate the base LCEs in accordance with any acquisition geometry. This yields the locations of the KIs that form the LCEs for any given acquisition geometry. The accuracy of these locations depends on the validity of the estimated subsurface velocity structure. As such, the base LCEs can be de-migrated in accordance with the acquisition geometries of the monitor (s), thereby removing the negative impacts of non-repeated surveys on the time-lapse travel time measurement. This could lead to time savings of the acquisition (e.g. reduced need to re-shoot sail lines), bringing down the cost of time-lapse surveys. 4D tomography is mentioned as a possible processing method to obtain useful attributes from the KI shifts. This technique falls into the category of non-linear inversion for estimating changes in a model parameter, but generalizes the inversion for use with non-zero offset pre-stack time-lapse seismic data. This relies on the assumption that the ray path geometries do not change between vintages. As such, Equation (1), which is not dependent on the distance travelled by the ray, can be used:

$$\Delta t \approx \sum_{j=1}^{M} t_{1,j} \frac{-\Delta v_j}{v_{2,j}} \qquad (1)$$

where $\Delta t$ is an offset-dependent time shift, $t_{1,j}$ is the travel time of the base ray, $v_{2,j}$ is the velocity of the monitor ray, and $\Delta v_j$ is the velocity change. The index j relates to the index of each cell through which the rays travel within the velocity field (through a total of M cells respectively). The assumption that the ray path geometries do not change between vintages implies that velocity changes and geomechanical compaction/dilation must be small enough to leave the ray paths unchanged to within the accuracy that ray theory approximates seismic wave energy propagation.

While Equation (1) describes only a single ray, it can be used to form a large linear tomographic system for all rays, which can then be inverted for the fractional change in velocity given a set of pre-stack time shifts. As such, the KI shifts are particularly suited as an input for such a method. The forward modelling operator is a matrix of travel times per cell for every ray path, modelled by ray tracing through an initial velocity field (such as that used to migrate both datasets). In matrix notation this can be written as:

$$\Delta t = B \frac{-\Delta v}{v} \qquad (2)$$

Equation (2) describes a linear tomographic system linking offset-dependent time shifts (i.e., the KI shifts), Δt, to model parameters, $$\frac{-\Delta v}{v},$$

via the tomography matrix, B, containing the travel time per cell of each ray. Equation (2) can be used to solve for velocity changes given an existing set of KI time shifts.

The time-lapse linear tomography scheme described by equation (2) has the objective function to be minimized with respect to the KI time shifts:

$$\varepsilon = \left\| \Delta t - B \frac{-\Delta v}{v} \right\|_2 \qquad (3)$$

The above description summarizes how time-lapse attributes might be more efficiently estimated from seismic kinematic information (i.e., data in terms of times and positions). It is conceivable that this method could be extended, or used to constrain other methods (e.g. full waveform inversion, least squares migration, etc), to make full use of the time-lapse seismic dynamic information (i.e., data in terms of times, positions and amplitudes). This would provide a new method to estimate useful time-lapse attributes from the recorded time-lapse shifts and amplitude changes, while avoiding overly simplistic physical approximations of seismic energy propagation.

To summarise, the methods disclosed herein reduce time-lapse processing duration (and potentially replace it entirely) to deliver production-related time-lapse information more quickly and cost-effectively. The methods are resilient against acquisition geometry changes between time-lapse vintages, reducing survey duration and cost. As such, better physical modelling of seismic energy propagation is achieved.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects (real time or otherwise) of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method for characterizing changes within a subsurface volume between a first time and a second time, said method comprising:
    performing a first survey of the subsurface volume at said first time to obtain first seismic data acquired by the transmission of seismic signals into the subsurface volume and subsequent detection of some or all of the seismic signals after reflection within the subsurface, said first seismic data corresponding to the first time;
    processing said first seismic data by migrating the first seismic data to obtain a seismic image of the subsurface volume;
    reversing said processing for relevant portions of said seismic image by de-migrating the relevant portions of said seismic image to obtain relevant portions of first seismic data, wherein the relevant portions of said seismic image comprise locally coherent events which relate to portions of the seismic image having spatial coherency; and the relevant portions of first seismic data comprise kinematic invariants having de-migrated positions which are invariant a model used for the migration and/or de-migration;
    performing a second survey of the subsurface volume at said second time to obtain second seismic data acquired by the transmission of seismic signals into the subsurface volume and subsequent detection of some or all of the seismic signals after reflection within the subsurface volume, said second seismic data corresponding to the second time;
    characterizing said changes within the subsurface volume between the first time and the second time by estimating the changes between said second seismic data and said relevant portions of first seismic data, said estimating comprising determining changes between the kinematic invariants of the first seismic data and local second seismic data, said local second seismic data being local to said kinematic invariants of the first seismic data, wherein characterizing said changes within the subsurface volume between the first time and the second time is performed substantially simultaneously with performing said second survey, thereby characterizing said changes in real time; and
    using the characterized changes to aid hydrocarbon recovery from a reservoir.

2. A method according to claim 1, wherein acquisition geometry values used in performing said migrating comprises first acquisition geometry values relating to a first acquisition geometry used in obtaining said first seismic data, and acquisition geometry values used in performing said de-migrating comprises second acquisition geometry values relating to a second acquisition geometry used in obtaining said second seismic data, said first acquisition geometry being different to said second acquisition geometry.

3. A method according to claim 1, wherein said step of determining changes comprises performing a localized inversion for said changes centered on the kinematic invariants.

4. A method according to claim 3, wherein said step of performing a localized inversion comprises performing an inversion within data windows centered on the kinematic invariants.

5. A method according to claim 3, further comprising the step of transforming the determined changes between the kinematic invariants of the first seismic data and local second seismic data into useful parameters.

6. A method according to claim 5, wherein said transforming into useful parameters comprises performing an attribute migration to obtain 4D time-shift attribute maps.

7. A method according to claim 5, wherein said transforming into useful parameters comprises performing 4D tomography to obtain 4D velocity change data.

8. A method according to claim 7, wherein said performing 4D tomography comprises minimizing an objective function with respect to the determined changes between the kinematic invariants of the first seismic data and local second seismic data, said objective function describing the variation of the 4D velocity change data with the determined changes between the kinematic invariants of the first seismic data and local second seismic data, in terms of travel times per region of the subsurface volume.

9. A non-transitory computer medium program comprising computer readable instructions which, when run on suitable computer apparatus, cause the computer apparatus to perform the method according to claim 1.

10. A non-transitory computer medium program carrier comprising the computer program of claim 9.

11. Apparatus comprising one or more processors specifically adapted to carry out the steps of the method according to claim 1.

\* \* \* \* \*